(12) United States Patent
Miyanaka et al.

(10) Patent No.: US 11,970,043 B2
(45) Date of Patent: Apr. 30, 2024

(54) AIR CONDITIONING DEVICE FOR RECLINER SEAT, SEAT COMPRISING SAID AIR CONDITIONING DEVICE, AND AIR CONDITIONING SYSTEM

(71) Applicant: Panasonic Intellectual Property Management Co., Ltd., Osaka (JP)

(72) Inventors: Ryota Miyanaka, Osaka (JP); Takahiro Yamaguchi, Osaka (JP); Yuki Odoriba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/737,130

(22) Filed: May 5, 2022

(65) Prior Publication Data

US 2022/0258562 A1 Aug. 18, 2022

Related U.S. Application Data

(63) Continuation of application No. PCT/JP2019/043363, filed on Nov. 6, 2019.

(51) Int. Cl.
*B60N 2/20* (2006.01)
*B60H 1/00* (2006.01)
*B60N 2/56* (2006.01)

(52) U.S. Cl.
CPC .......... *B60H 1/00285* (2013.01); *B60N 2/20* (2013.01); *B60N 2/5642* (2013.01); *B60N 2/5678* (2013.01)

(58) Field of Classification Search
CPC ...... B60N 2/5678; B60N 2/20; B60N 2/5642; B60H 1/00285
See application file for complete search history.

(56) References Cited

U.S. PATENT DOCUMENTS

| | | | |
|---|---|---|---|
| 10,744,915 B2* | 8/2020 | McElroy | B60N 2/5657 |
| 2020/0108753 A1 | 4/2020 | Fujii et al. | |
| 2021/0016686 A1* | 1/2021 | Yetukuri | B60N 2/5621 |
| 2021/0078471 A1* | 3/2021 | Fujita | B60N 2/58 |

FOREIGN PATENT DOCUMENTS

| | | |
|---|---|---|
| JP | 56-97416 | 8/1981 |
| JP | 62-107762 | 7/1987 |
| JP | 2004-268848 | 9/2004 |

(Continued)

OTHER PUBLICATIONS

International Search Report dated Jan. 7, 2020 in International (PCT) Application No. PCT/JP2019/043363.

*Primary Examiner* — Syed A Islam
(74) *Attorney, Agent, or Firm* — Wenderoth, Lind & Ponack, L.L.P.

(57) ABSTRACT

An air conditioning device (10) is an air conditioning device (10) for a reclining seat (10) comprising a seat part (1b) and a backrest part (1a), the air conditioning device (10) comprising a ventilator and a controller (11). The ventilator is provided to at least one of the seat part (1b) and the backrest part (1a), and includes a first air flow path (A1, A2) formed inside the seat part (1b) or the backrest part (1a). The controller (11) determines a reclining state of the backrest part (1a) with respect to the seat part (1b), and controls air in the first air flow path (A1, A2) in accordance with the determined reclining state.

8 Claims, 7 Drawing Sheets

(56) References Cited

FOREIGN PATENT DOCUMENTS

| | | | | |
|---|---|---|---|---|
| JP | 2006-102061 | 4/2006 | | |
| JP | 2007-106290 | 4/2007 | | |
| JP | 2017-170983 | 9/2017 | | |
| JP | 2019-6156 | 1/2019 | | |
| WO | WO-2018235472 A1 | * 12/2018 | ............... | A47C 7/62 |
| WO | WO-2019159656 A1 | * 8/2019 | ........... | B60N 2/5642 |

* cited by examiner

AIR CONDITIONING DEVICE FOR RECLINER SEAT, SEAT COMPRISING SAID AIR CONDITIONING DEVICE, AND AIR CONDITIONING SYSTEM

TECHNICAL FIELD

The present disclosure relates to an air conditioning device applied in a reclining seat installed in a predetermined space, a seat comprising said air conditioning device, and an air conditioning system.

BACKGROUND ART

Conventionally, there have been vehicle seats in which the amount of air blown by an air blower placed in a ventilation path in the vehicle seat is adjusted in accordance with a temperature and humidity around an occupant seated in the seat (for example, Patent Literature 1).

SUMMARY

Seats installed in means of movement such as aircraft, trains, and ships are not used in the same states, and passengers may assume various postures on the seats. For example, seats may be used while fully reclined, and passengers may sit, lie down, etc., while covered with a blanket or other covering. Thus, it is difficult to achieve the desired temperature and humidity in individual seats in situations where the seat states and the postures of the passengers change.

The present disclosure provides an air conditioning device for a reclining seat with which a comfortable air environment can be actualized for each seat, a seat comprising said air conditioning device, and an air conditioning system.

The air conditioning device of the present disclosure is an air conditioning device for a reclining seat comprising a seat part and a backrest part, the air conditioning device comprising a ventilator and a controller. The ventilator includes a first air flow path which is provided to at least one of the seat part and the backrest part, and which is formed inside the seat part or the backrest part. The controller determines a reclining state of the backrest part with respect to the seat part, and controls air in the first air flow path in accordance with the determined reclining state.

The seat of the present disclosure comprises the air conditioning device described above, a seat part, and a backrest part capable of reclining at a predetermined angle in relation to the seat part.

The air conditioning system of the present disclosure comprises the air conditioning device described above and an imaging device. The imaging device captures an image of the seat and outputs the image of the seat. The controller determines whether or not the seat is in a first state on the basis of the image of the seat. The first state is a state in which there is a covering on the seat. When the seat is in the first state, the controller causes air to be suctioned in and expelled in the first air flow path such that air circulates between the first air flow path and a second air flow path formed in the covering.

The air conditioning device for a reclining seat, the seat comprising said air conditioning device, and the air conditioning system of the present disclosure are effective in realizing a comfortable air environment for each seat.

DESCRIPTION OF EMBODIMENTS

Embodiments are described in detail below with reference to the drawings as appropriate. However, descriptions that are more detailed than necessary may be omitted. For example, detailed descriptions of already well-known matters and duplicate descriptions for substantially the same configuration may be omitted. This is to avoid unnecessary redundancy of the following description and to facilitate understanding by those skilled in the art.

It should be noted that the accompanying drawings and the following description are provided for those skilled in the art to fully understand the present disclosure, and are not intended to limit the subject matter set forth in the claims.

1. Embodiment 1

1-1. Configurations

1-1-1. Configuration of Seat 1

Figure 1:
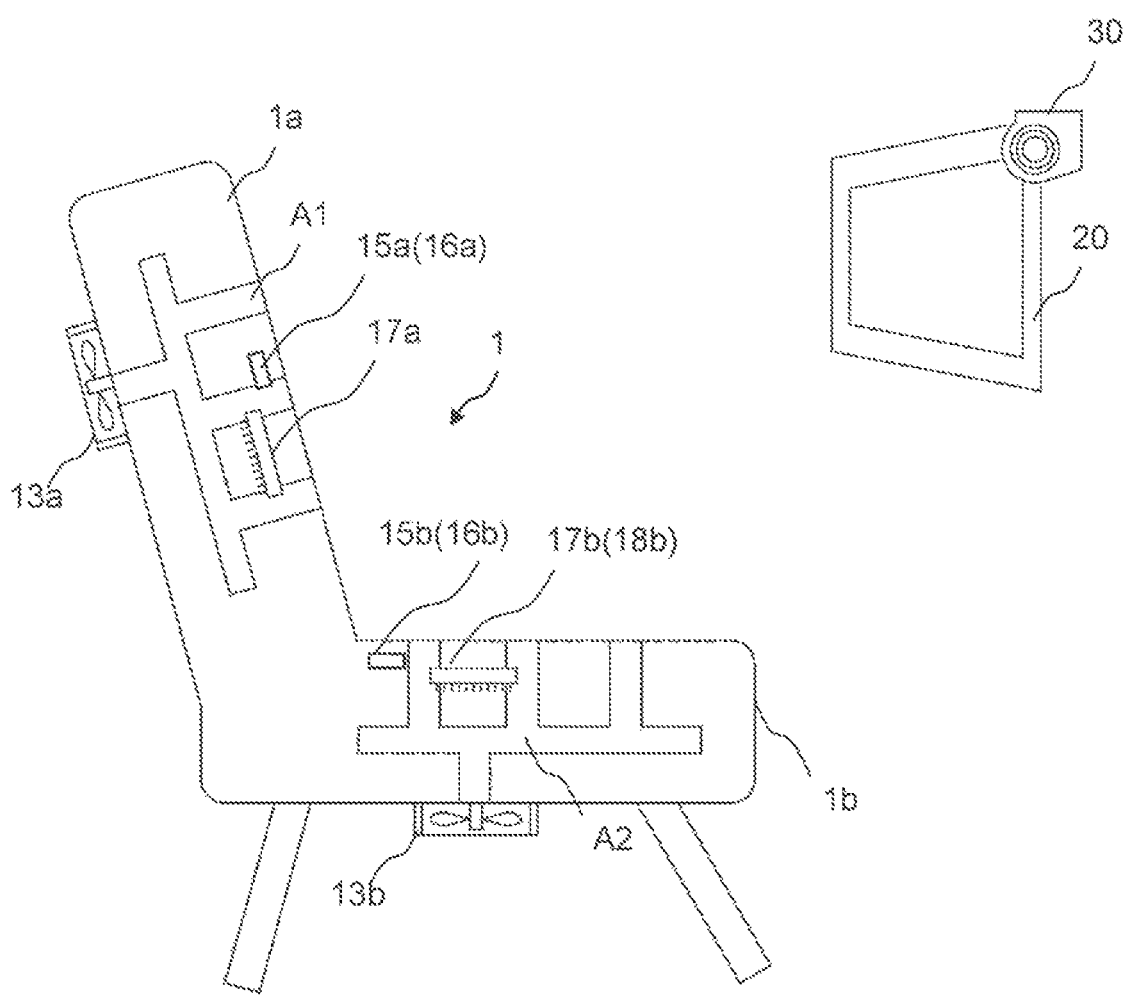
FIG. 1 shows a seat according to Embodiment 1 in an upright position and an imaging device for capturing an image of the seat.
Figure 2:
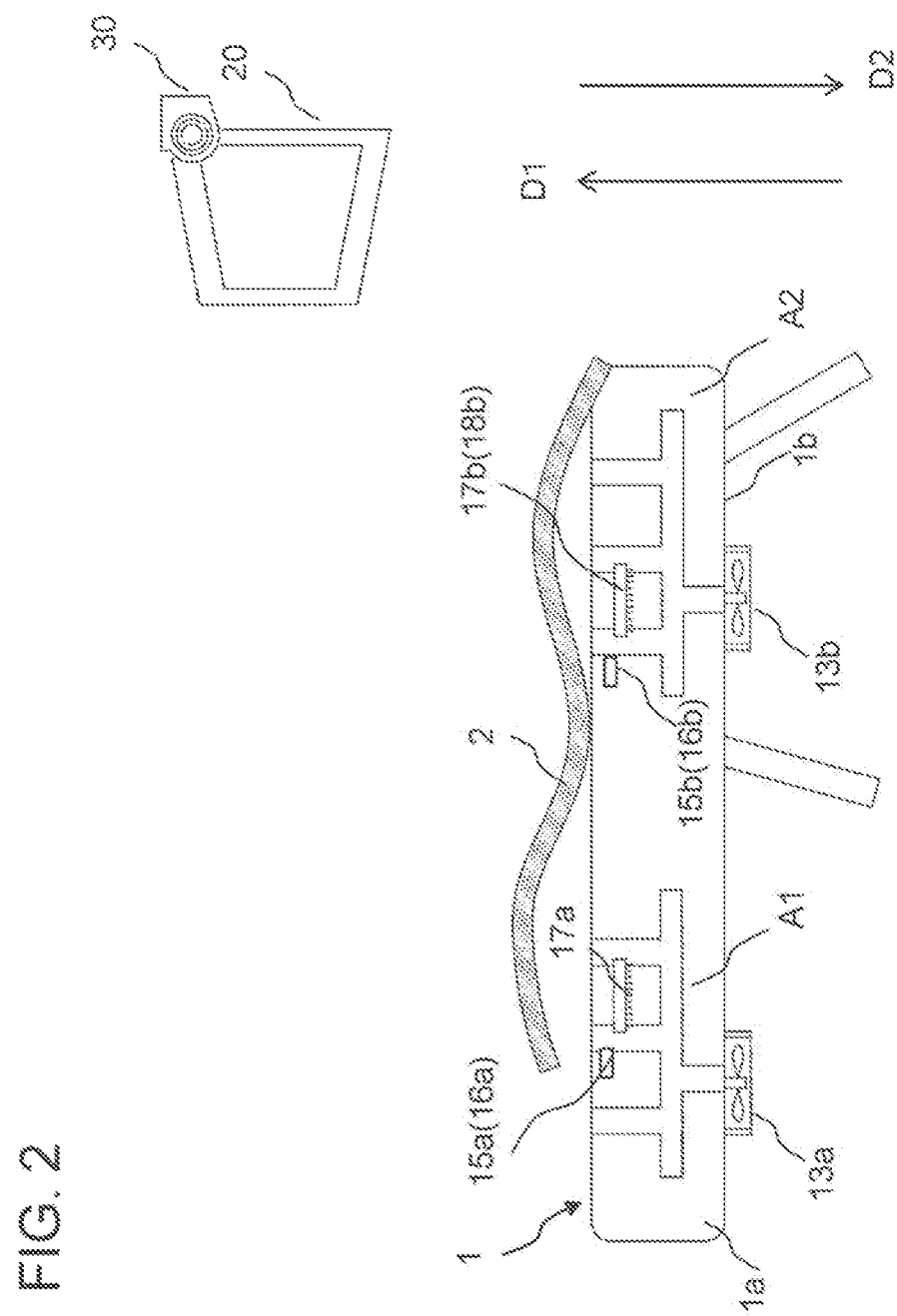
FIG. 2 shows the seat according to Embodiment 1 in a fully reclined position and the imaging device for capturing an image of the seat.

FIGS. 1 and 2 show a seat 1 according to the present embodiment. The seat 1 is used as a seat for a means of motion such as, for example, an aircraft. The seat 1 comprises a seat part 1b and a backrest part 1a. A lower end part of the backrest part 1a is attached to a rear end part of the seat part 1b, and the backrest part 1a can recline backward with the lower end part of the backrest part 1a as a fulcrum.

In the description below, a state in which the backrest part 1a is substantially upright in relation to the seat part 1b, as shown in FIG. 1, is referred to as an "upright position" (an example of a second position) of the seat 1. A state in which an angle is 90° is not a limitation on the substantially upright state; for example, the backrest part may be inclined at an angle less than 90° provided that this angle allows a user in the seat 1 to maintain a sitting posture. In addition, a state in which the backrest part 1a lies backward and is not inclined in relation to the seat part 1b, i.e., a state in which there is substantially no angle, as shown in FIG. 2, is referred to as a "flat position" (an example of a first position) of the seat 1. The fully reclined state at which the angle is 0° is not a limitation on the state in which there is substantially no angle; for example, the angle may be in the range of 0° or more and less than 45°, allowing the user in the seat 1 to sleep in a relaxed state.

In the description below, a side of the seat 1 that supports the user is referred to as a "front side," and a side opposite from the front side is referred to as a rear side.

In the seat 1, air flow paths A1, A2 (an example of first air flow paths) are formed inside the backrest part 1a and the seat part 1b, as shown in FIGS. 1 and 2. The seat 1 has an upper fan 13a, a lower fan 13b, a pressure sensor 14a (FIG.

3), temperature sensors 15a, 15b, humidity sensors 16a, 16b, coolers 17a, 17b, and a heater 18b.

The upper fan 13a is disposed near an air inlet of the air flow path A1 on a rear side of the backrest part 1a. The upper fan 13a rotates due to a motor (not shown) and moves the air inside the air flow path A1. Due to the rotation of the upper fan 13a, either "air expelling" is performed, in which air is moved from the rear side of the backrest part 1a to the front side, i.e., in a ventilation direction D1 in FIG. 2, or "air suctioning" is performed, in which air is moved from the front side to the rear side, i.e., in a ventilation direction D2 in FIG. 2. The upper fan 13a may switch between air expelling and air suctioning by rotating forward or in reverse. Alternatively, the upper fan 13a may be configured from two fans including a fan that rotates forward and a fan that rotates in reverse.

The lower fan 13b is disposed near an air inlet of the air flow path A2 on a rear side of the seat part 1b. The lower fan 13b rotates due to a motor (not shown) and moves the air inside the air flow path A2. Due to the rotation of the lower fan 13b, either "air is expelled," in which air is moved from the rear side of the seat part 1b to the front side, i.e., in the ventilation direction D1 in FIG. 2, or "air is suctioned in," in which air is moved from the front side to the rear side, i.e., in the ventilation direction D2 in FIG. 2. The lower fan 13b may switch between air expelling and air suctioning by rotating forward or in reverse. Alternatively, the lower fan 13b may be configured from two fans including a fan that rotates forward and a fan that rotates in reverse.

The pressure sensor 14a (FIG. 3) is disposed on the internal front side of the backrest part 1a, and the pressure sensor 14a measures a load, i.e., pressure exerted on the backrest part 1a by the user sitting in the seat 1, converts the load to an electric signal, and outputs the signal.

The temperature sensor 15a is disposed on the internal front side of the backrest part 1a or in a periphery of the internal front side, and the temperature sensor 15a measures temperature, converts the temperature to an electric signal, and outputs the signal. The temperature sensor 15b is disposed on the internal front side of the seat part 1b or in a periphery of the internal front side, and the temperature sensor 15b measures temperature, converts the temperature to an electric signal, and outputs the signal. The humidity sensor 16a is disposed on the internal front side of the backrest part 1a or in the periphery of the internal front side, and the humidity sensor 16a measures humidity, converts the humidity to an electric signal, and outputs the signal. The humidity sensor 16b is disposed on the internal front side of the seat part 1b or in a periphery of the internal front side, and the humidity sensor 16b measures humidity, converts the humidity to an electric signal, and outputs the signal. The temperature sensor 15a and the humidity sensor 16a may be provided in a single module as a temperature/humidity sensor as shown in FIGS. 1 and 2. Similarly, the temperature sensor 15b and the humidity sensor 16b may also be provided in a single module.

The cooler 17a includes, for example, a Peltier element and is disposed inside the backrest part 1a. The cooler 17a cools the air in the air flow path A1. The cooler 17b includes a Peltier element and is disposed inside the seat part 1b. The cooler 17b cools the air in the air flow path A2.

The heater 18b includes, for example, a Peltier element and is disposed inside the seat part 1b. The heater 18b cools the air in the air flow path A2. The Peltier element of the cooler 17b may also serve as the heater 18b. In this case, heating and cooling performed by the Peltier element may be switched by controlling an electric current.

1-1-2. Configuration of Air Conditioning System 100

Figure 3:
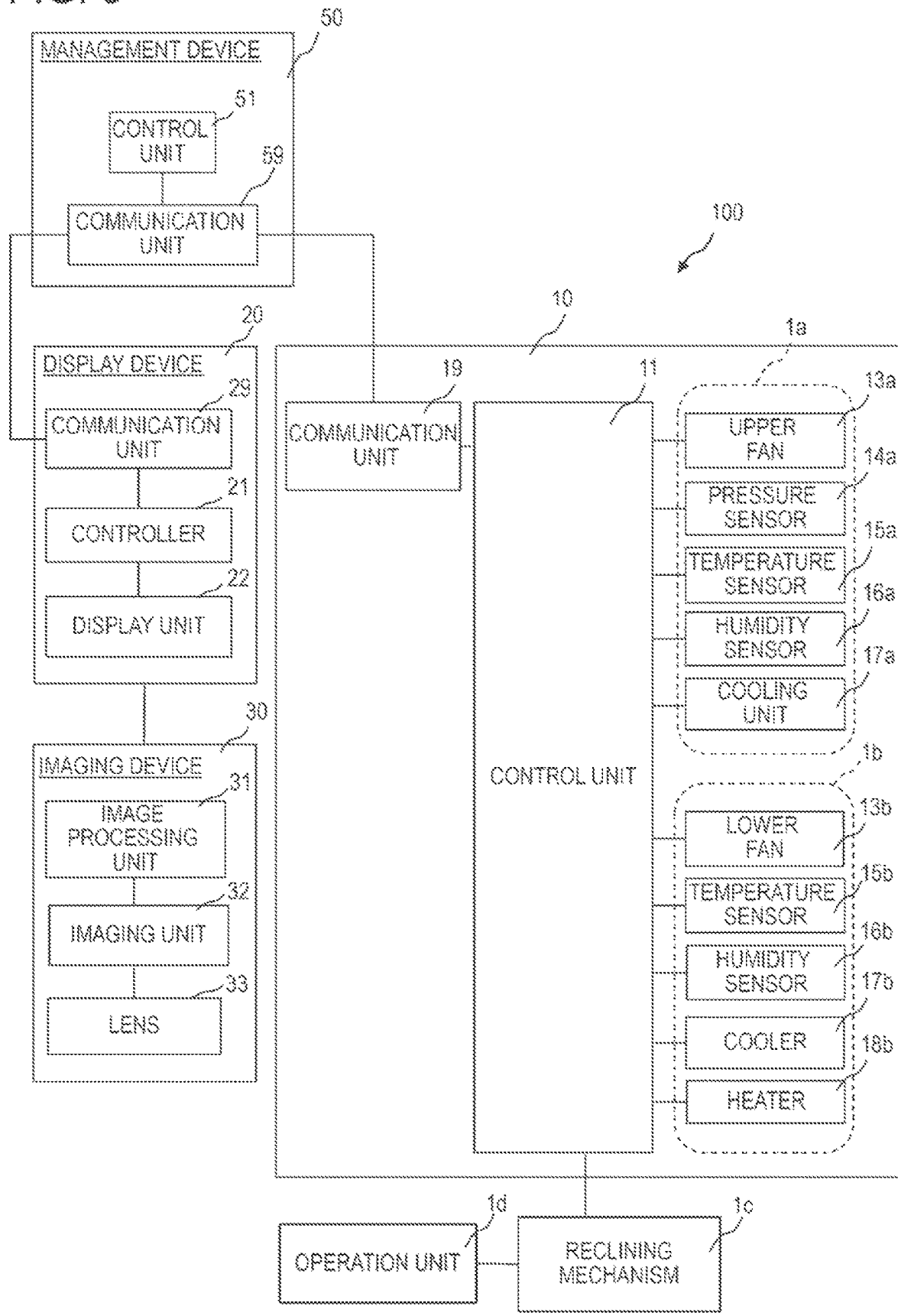
FIG. 3 shows a configuration of an air conditioning system including the air conditioning device according to Embodiment 1.

FIG. 3 shows a configuration of an air conditioning system 100 including an air conditioning device 10 according to the present embodiment. The air conditioning system 100 comprises the air conditioning device 10, a display device 20, an imaging device 30, and a management device 50. Individual air conditioning devices 10 are each connected to a corresponding display device 20 and imaging device 30 via the management device 50. The display device 20 is connected to the imaging device 30.

1-1-3. Configuration of Air Conditioning Device 10

As shown in FIG. 3, the air conditioning device 10 is disposed in the seat 1 shown in FIGS. 1 and 2, and comprises a controller 11, and the above-described upper fan 13a, lower fan 13b, pressure sensor 14a, temperature sensors 15a, 15b, humidity sensors 16a, 16b, coolers 17a, 17b, and heater 18b, which are connected to the controller 11.

The controller 11 (an example of a controller) of the air conditioning device 10 is configured from, for example: a central processing unit (CPU), a micro processing unit (MPU), or another computation processing circuit; RAM, ROM, flash memory, and other forms of memory; and other peripheral circuitry. The controller 11 executes a predetermined program to execute air conditioning control for the seat 1.

Specifically, the controller 11 determines the pressure in the backrest part 1a on the basis of the electric signal from the pressure sensor 14a. The controller 11 determines the temperatures in the backrest part 1a and the seat part 1b on the basis of the electric signals from the temperature sensors 15a, 15b. The controller 11 determines the levels of humidity in the backrest part 1a and the seat part 1b on the basis of the electric signals from the humidity sensors 16a, 16b. The controller 11 controls the turning on and off of the upper fan 13a and the lower fan 13b, and rotation speeds (speeds) of the fans, in accordance with the determined pressure, temperature, and/or humidity. The controller 11 controls the turning on and off of the coolers 17a, 17b and the heater 18b in accordance with the determined pressure, temperature, and/or humidity.

The controller 11 is also connected to a reclining mechanism 1c and determines a reclining state of the seat 1. The reclining mechanism 1c of the seat 1 moves the backrest part 1a due to the user operating an operation unit 1d, and puts the seat 1 into the reclining state desired by the user (upright position or fully reclined position). The operation unit 1d may be actualized as a remote controller (not shown) installed in the seat 1 or a touch panel provided to the display device 20.

A communication unit 19 includes, for example, a network card, a network adapter, and other circuitry for communicating with other computer devices. The communication unit 19 is connected to the management device 50 via a cable, etc.

1-1-4. Configuration of Display Device 20

A display device 20 is installed in front of each seat 1 as shown in FIGS. 1 and 2, and the display device 20 displays content such as videos and music, and other information delivered from the management device 50. The display device 20 comprises a controller 21, a display unit 22, and a communication unit 29 for actualizing functions of the display device 20, as shown in FIG. 3.

The controller 21 is configured from, for example: a central processing unit (CPU), a micro processing unit (MPU), or another computation processing circuit; RAM, ROM, flash memory, and other forms of memory; and other peripheral circuitry. The controller 21 includes circuitry that executes predetermined programs to execute the functions of the display device 20.

The display unit 22 has an LCD, an organic EL display, or another display screen. The display unit 22 is also provided with a touch panel.

The communication unit 29 includes, for example, a network card, a network adapter, and other circuitry for communicating with other computer devices. The communication unit 29 is connected to the management device 50 via a cable, etc.

1-1-5. Configuration of Imaging Device 30

The imaging device 30 is disposed such that the seat 1 in front of the display device 20 is in an imaging range, and the imaging device 30 captures an image of the seat 1. The imaging device 30 comprises an image processing unit 31, an imaging unit 32, and a lens 33. The imaging device 30 may be incorporated as part of the display device 20.

The image processing unit 31 includes, for example, a central processing unit (CPU), a micro processing unit (MPU), or another computation processing circuit, and carries out necessary image processing on the image from the imaging unit 32.

The imaging unit 32 includes a complementary metal oxide semiconductor (CMOS) sensor, a charged coupled device (CCD) sensor, and other imaging elements. The imaging unit 32 converts a subject including the seat 1 imaged by the lens 33 into an electric signal by photoelectric conversion, and outputs the signal to the image processing unit 31.

1-1-6. Configuration of Management Device 50

The management device 50 is connected to a plurality of display devices 20 and air conditioning devices 10 via wired cables and relay equipment. The management device 50 is a computer device that can be connected to a plurality of display devices 20 and that functions as, for example, a server.

The management device 50 comprises a controller 51 and a communication unit 59 as shown in FIG. 3. Though not shown, the management device 50 may be connected to a storage device. The storage device stores an image transmitted from the display device 20 and information (e.g., flight information) received from another management system (e.g., an aircraft management system).

The controller 51 is configured from, for example: a central processing unit (CPU), a micro processing unit (MPU), or another computation processing circuit; RAM, ROM, flash memory, and other forms of memory; and other peripheral circuitry. The controller 51 includes circuitry that executes predetermined programs to execute the functions of the management device 50. Particularly, on the basis of the image of the seat 1 acquired from the imaging device 30, the controller 51 analyzes whether or not a wrap or another covering 2 (FIG. 2) such as a blanket has been placed over the seat 1 and depending on this analysis determines whether or not the seat 1 is in a predetermined state. This analysis may be performed by storing pattern information for a color and/or a shape of the covering in advance and comparing the pattern information and the image. The determination determines whether or not the covering is covering the seat 1 (e.g., occupying at least 50% of the surface of the seat 1). Upon determining that the covering is covering the seat 1 (an example of a first state), the controller 51 transmits a determination result to the corresponding air conditioning device 10.

The communication unit 59 includes, for example, a network card, a network adapter, and other circuitry for communicating with other computer equipment. The communication unit 59 is connected to the display devices 20 and individual air conditioning devices 10 via cables, etc.

1-2. Actions

An example of air conditioning control performed by the controller 11 of the air conditioning device 10 shall mainly be described with reference to FIGS. 4 to 7.

1-2-1. First Example

Figure 4:
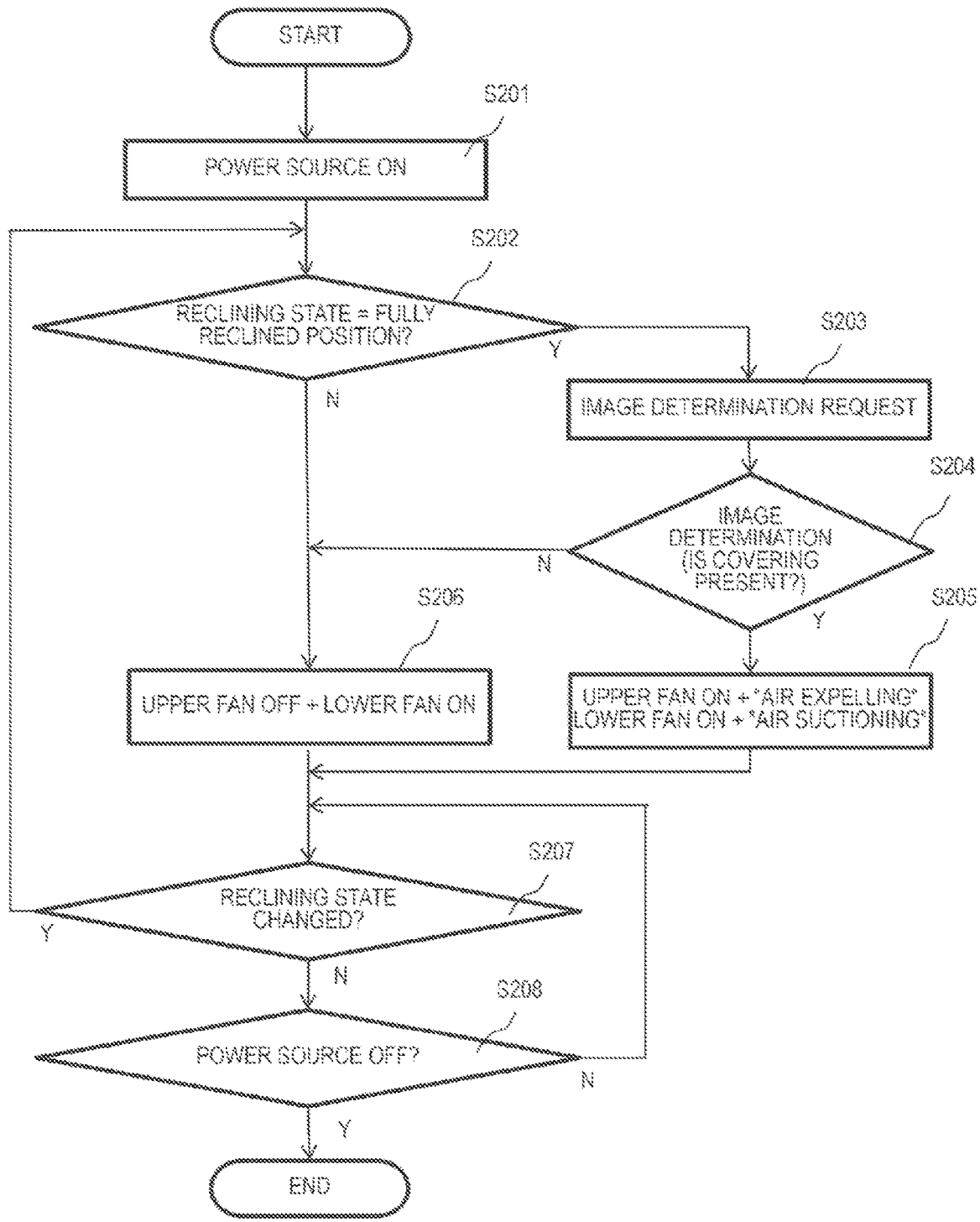
FIG. 4 is a flowchart of a first example of air conditioning control executed by the air conditioning device.

In the example shown in FIG. 4, the controller 11 of the air conditioning device 10 controls the directions of ventilation (D1 and D2 shown in FIG. 2) caused by the upper fan 13a and the lower fan 13b and the turning on and off of the fans, in accordance with the reclining state of the seat 1. A power source (not shown) of the air conditioning device 10 is turned on (S201). The power source of the air conditioning device 10 is turned on or off in accordance with the operation of the operation unit 1d (FIG. 3) performed by the user and a command from the management device 50. The controller 11 determines the reclining state of the seat 1 (S202). When the seat 1 is in the fully reclined position (Yes in S202), the controller 11 transmits an image determination request to the management device 50 (S203).

Upon receiving the image determination request, the management device 50 transmits a command to the corresponding display device 20 and acquires the image captured by the imaging device 30. The image is image data of the corresponding seat 1. The management device 50 analyzes the image of the seat 1 as described above and determines whether or not the seat 1 is in a predetermined state, or in other words, covered by the covering 2 (FIG. 2) (S204). When the covering 2 is covering the seat 1 (Yes in S204) according to the determination result, the determination result is returned to the air conditioning device 10. In accordance with this determination result, the controller 11 of the air conditioning device 10 turns on the upper fan 13a and causes air to be expelled, and also turns on the lower fan 13b and causes air to be suctioned in (S205). As a result, in a fully reclined seat 1 such as is shown in FIG. 2, the air expelling of the upper fan 13a causes the air in the air flow path A1 to flow in the ventilation direction D1, and the air suctioning of the lower fan 13b causes the air in the air flow path A2 to flow in the ventilation direction D2. The air coming away from the air flow path A1 is guided into the air flow path A2 via an air flow path (an example of a second air flow path) formed on the front side of the seat 1 covered by the covering 2. As a result, air circulates in the portion covered by the covering 2, and a comfortable air environment for the sleeping user can therefore be created.

In step S205, air may be suctioned in by the upper fan 13a and air may be expelled by the lower fan 13b.

When the seat 1 is not in the fully reclined position (No in S202) or when the covering 2 is not covering the seat 1 (No in S204), the controller of the air conditioning device 10 turns off the upper fan 13a, turns on the lower fan 13b, and causes air to be expelled (S206). This is not a limitation on step S206; air conditioning control matching the surrounding environment and/or preferences of the user may be performed.

For example, air may be expelled or suctioned in with the upper fan 13a turned on, and the lower fan 13b may be turned off or air may be suctioned in by the lower fan 13b. Alternatively, the upper fan 13a and the lower fan 13b may be turned off.

When the reclining state has changed, the process returns to step S202 (S207), and the air conditioning control described above is repeated until the power source is turned off (Yes in S208).

As a modification of the first example, the processes of steps S203 and S204 may be omitted. In other words, the controller 11 may execute step S205 upon determining that the seat 1 is in the fully reclined position (Yes in S202). This is because when the seat 1 is in the fully reclined position, the user is presumed to be sleeping and is presumed to be using a covering.

As another modification of the first example, the determination process of step S202 may be omitted. In other words, the controller 11 performs the process of step S205 only by determining that the covering 2 (FIG. 2) is covering the seat 1 regardless of the reclining state of the seat 1.

1-2-2. Second Example

Figure 5:
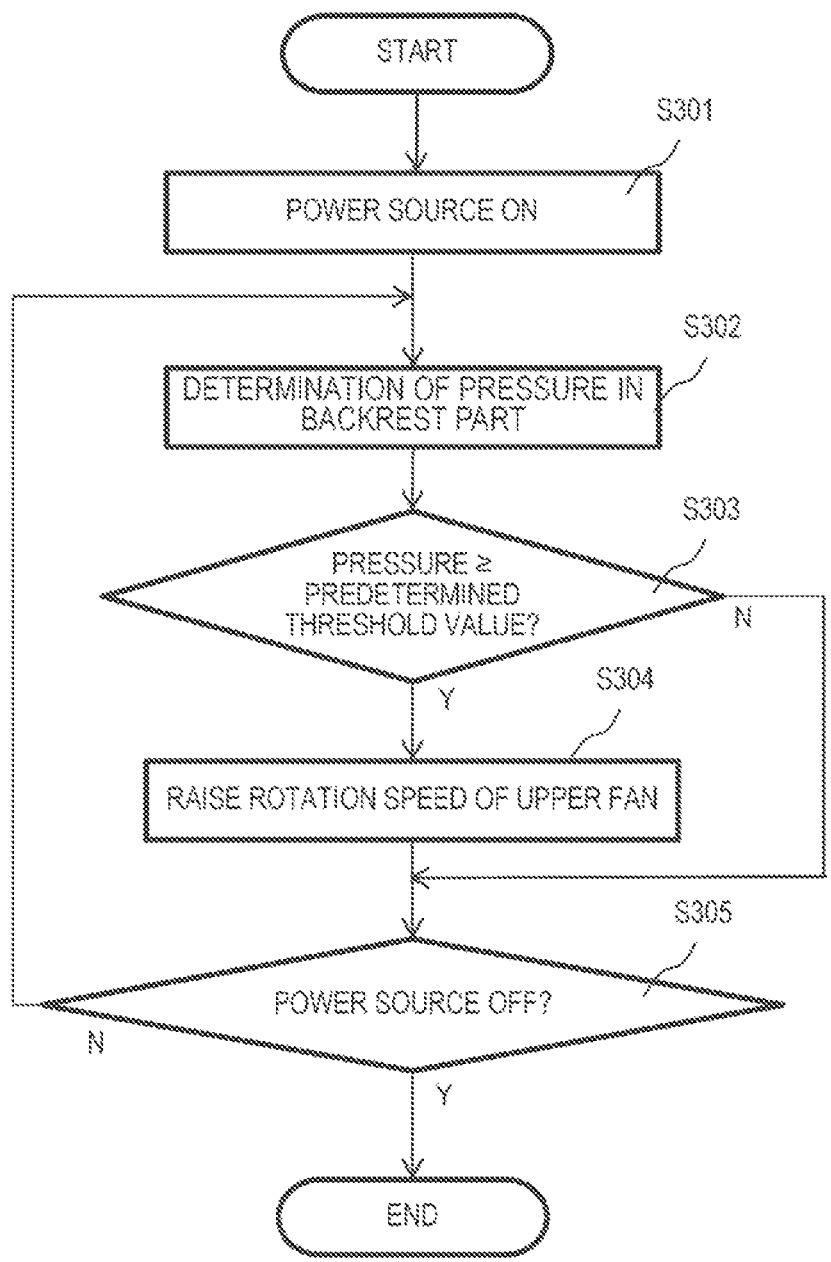
FIG. 5 is a flowchart of a second example of air conditioning control executed by the air conditioning device.

In the example shown in FIG. 5, the controller 11 of the air conditioning device 10 controls the rotation speeds of the upper fan 13a and the lower fan 13b in accordance with the pressure exerted on the backrest part 1a of the seat 1. Air conditioning control in the second example may be executed in addition to or independently of the air conditioning control in the first example. When air conditioning control in the second example is executed in addition to that in the first example, the air conditioning controls may be given priority rankings and executed accordingly.

The power source (not shown) of the air conditioning device 10 is turned on as in the first example (S301). The upper fan 13a is turned on and caused to rotate at a normal rotation speed. Ventilation may occur in the direction of expelling air or suctioning in air. The controller 11 determines the pressure measured by the pressure sensor 14a disposed in the backrest part 1a (S302). When a value of the determined pressure is equal to or greater than a predetermined threshold value (Yes in S303), the controller 11 raises the rotation speed of the upper fan 13a (S304). When the value of the determined pressure is less than the predetermined threshold value (No in S303), the controller 11 does not change the rotation speed of the upper fan 13a.

When a user sits in the seat 1, the load (pressure) exerted on the backrest part 1a differs depending on the reclining state, the posture and body weight of the user, etc. The backrest part 1a deforms commensurately further as the pressure received increases, and ventilation in the air flow path A1 (FIG. 1) is also suppressed. Therefore, in the air conditioning control in the present example, the rotation speed of the upper fan 13a is raised to promote a commensurately greater air flow as the pressure exerted on the backrest part 1a increases. As a result, air conduction in the backrest part 1a can be improved and a comfortable air environment for the user sitting in the seat 1 can be created.

As long as the power source is not turned off, steps S302 to S304 are repeated, and when the power source is turned off (Yes in S305), air conditioning control is ended.

As a modification of the second example, the controller 11 may determine the reclining state of the seat 1 before the pressure determination in step S302. In this case, the controller 11 may perform the pressure determination in step S302 upon determining that the reclining state of the seat 1 is an inclination angle within a predetermined range.

As a modification of the second example, the controller 11 may perform control for turning on the upper fan 13a in accordance with the value of the pressure exerted on the backrest part 1a. In this case, the upper fan 13a remains off when the power source is turned on in step S301 of FIG. 5, and the upper fan 13a is turned on in step S304 of FIG. 5.

As another modification of the second example, the rotation speed of the upper fan 13a in step S304 may be provided in multiple stages. In this case, the controller 11 may compare the pressure applied to the backrest portion 1a with a plurality of threshold values, determine the pressure, and change the rotation speed of the upper fan 13a to a stage that corresponds to the determination result.

As yet another modification of the second example, the controller 11 may perform air conditioning control by lowering the rotation speed of the upper fan 13a. In this case, the upper fan 13a is activated at a high rotation speed when the power source is turned on in step S301 of FIG. 5, and the controller 11 lowers the rotation speed of the upper fan 13a when the value of the determined pressure is equal to or less than a predetermined second threshold value, i.e., when the backrest portion 1a is not under enough pressure to suppress the ventilation in the air flow path A1.

The second example posited that the ventilation by the upper fan 13a and the lower fan 13b may occur in the direction of expelling air or suctioning in air, but during air suctioning, the rotation speeds of the upper fan 13a and the lower fan 13b may be set higher than during air expelling. This is because during air suctioning, air flows from the front side to the back side of the seat 1, so that the user is less likely to feel coolness than during air expelling in which air is sent from the back side to the front side.

1-2-3. Third Example

Figure 6:
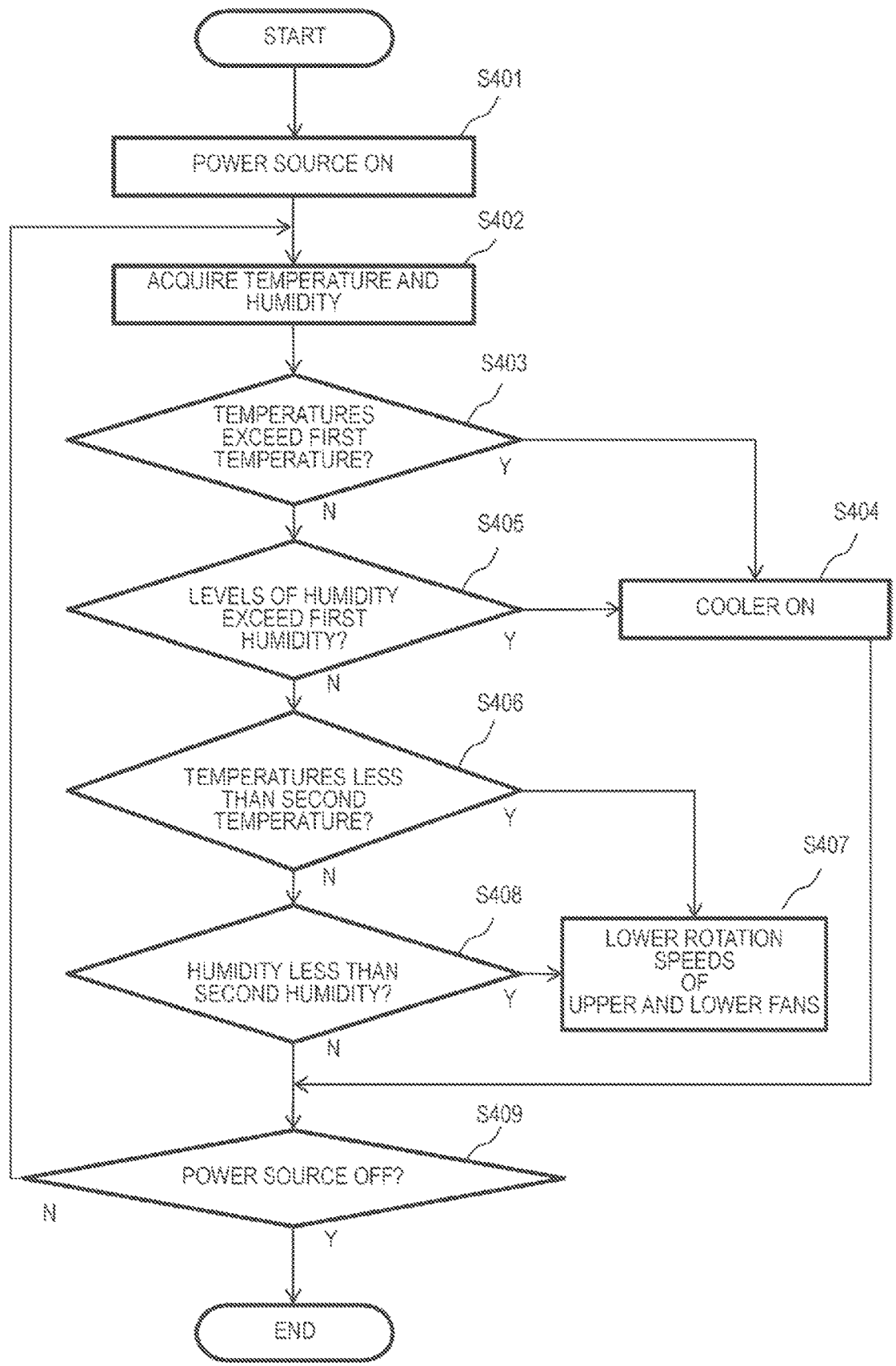
FIG. 6 is a flowchart of a third example of air conditioning control executed by the air conditioning device.

Air conditioning control according to a third example shown in FIG. 6 is effective particularly in hot climates. The controller 11 of the air conditioning device 10 performs actions such as turning on the coolers 17a, 17b in accordance with the temperature and humidity of the seat 1, and changing the rotation speeds of the upper fan 13a and the lower fan 13b. The air conditioning control of the third example may be executed in addition to or independently of the air conditioning control of the first example and/or the second example. When air conditioning control of the third example is executed in addition to that of the first example and/or the second example, the air conditioning controls may be given priority rankings and executed accordingly.

The power source (not shown) of the air conditioning device 10 is turned on (S401) as in the first example. The coolers 17a, 17b are in the off state, and the upper fan 13a and the lower fan 13b rotate at normal rotation speeds.

The controller 11 acquires the temperatures measured by the temperature sensors 15a, 15b and the levels of humidity measured by the humidity sensors 16a, 16b (S402).

The controller 11 determines whether or not the measured temperatures exceed a first temperature (S403). The controller 11 turns on the cooler 17a when the temperature measured by the temperature sensor 15a exceeds the first temperature (S404), and turns on the cooler 17b when the temperature measured by the temperature sensor 15*b* exceeds the first temperature (S404).

The controller 11 determines whether or not the levels of humidity measured by the humidity sensors 16*a*, 16*b* exceed a first humidity (S405). The controller 11 turns on the cooler 17*a* when the humidity measured by the humidity sensor 16*a* exceeds the first humidity (S404), and turns on the cooler 17*b* when the humidity measured by the humidity sensor 16*b* exceeds the first humidity (S404).

Due to this air conditioning control, the air in the air flow paths A1, A2 inside the backrest part 1*a* and the seat part 1*b* is cooled when temperature or humidity is high, and the user on the seat 1 can feel coolness.

Next, the controller 11 determines whether or not the temperatures measured by the temperature sensors 15*a*, 15*b* are less than a second temperature (<first temperature) (S406). The controller 11 lowers the rotation speed of the upper fan 13*a* when the temperature measured by the temperature sensor 15*a* is less than the second temperature (S407), and lowers the rotation speed of the lower fan 13*b* when the temperature measured by the temperature sensor 15*b* is less than the second temperature (S407).

The controller 11 determines whether or not the levels of humidity measured by each of the humidity sensors 16*a*, 16*b* are less than a second humidity (<first humidity) (S408). The controller 11 lowers the rotation speed of the upper fan 13*a* when the humidity measured by the humidity sensor 16*a* is less than the second humidity (S407), and lowers the rotation speed of the lower fan 13*b* when the humidity measured by the humidity sensor 16*b* is less than the second humidity (S407).

Due to this air conditioning control, when the temperature or humidity is low, it is possible to prevent the user on the seat 1 from feeling cold by weakening the air flow in the air flow paths A1, A2 inside the backrest part 1*a* and the seat part 1*b*.

As long as the power source is not turned off, steps S402 to S408 are repeated, and when the power source is turned off (Yes in S409), air conditioning control is ended.

As a modification of the third example, the controller 11 may execute the air conditioning control of steps S402 to S408 on the condition that the covering 2 (FIG. 2) is recognized on the seat 1 according to the image determination as was determined in the first example, and/or the seat 1 is in the fully reclined position. When the covering 2 (FIG. 2) is on the seat 1, the user can sleep comfortably by adjusting the air inside the covering to a comfortable temperature and humidity. A comfortable temperature is, for example, about 32.5° C. to 33.5° C., and a comfortable humidity is about 50%. The first temperature and first humidity and/or the second temperature and second humidity may be set so that the measured temperatures and levels of humidity satisfy these numerical conditions.

As another modification of the third example, the controller 11 may turn on the coolers 17*a*, 17*b* only when the temperatures exceed the first temperature and the levels of humidity exceed the first humidity. Similarly, the controller 11 may lower the rotation speeds of the upper fan 13*a* and the lower fan 13*b* also when the temperatures are less than the second temperature and the levels of humidity are less than the second humidity.

As yet another modification of the third example, the controller 11 may raise the rotation speeds of the upper fan 13*a* and the lower fan 13*b* in step S404. In this case, the coolers 17*a*, 17*b* may be always on after the power source has been turned on in step S401.

As yet another modification of the third example, the controller 11 may perform control for turning on the upper fan 13*a* and the lower fan 13*b* in accordance with the temperatures and/or the levels of humidity in steps S406 to S408. In this case, the upper fan 13*a* and the lower fan 13*b* are put into the off state after the power source has been turned on in step S401, and the upper fan 13*a* and the lower fan 13*b* are turned on in step S407.

As yet another modification of the third example, the rotation speeds of the upper fan 13*a* and the lower fan 13*b* may be provided in multiple stages. In this case, the controller 11 may compare the measured temperatures and/or levels of humidity with a plurality of threshold values, determine the temperatures and/or levels of humidity, and change the rotation speeds of the upper fan 13*a* and the lower fan 13*b* to a stage that corresponds to the determination result.

1-2-4. Fourth Example

Figure 7:
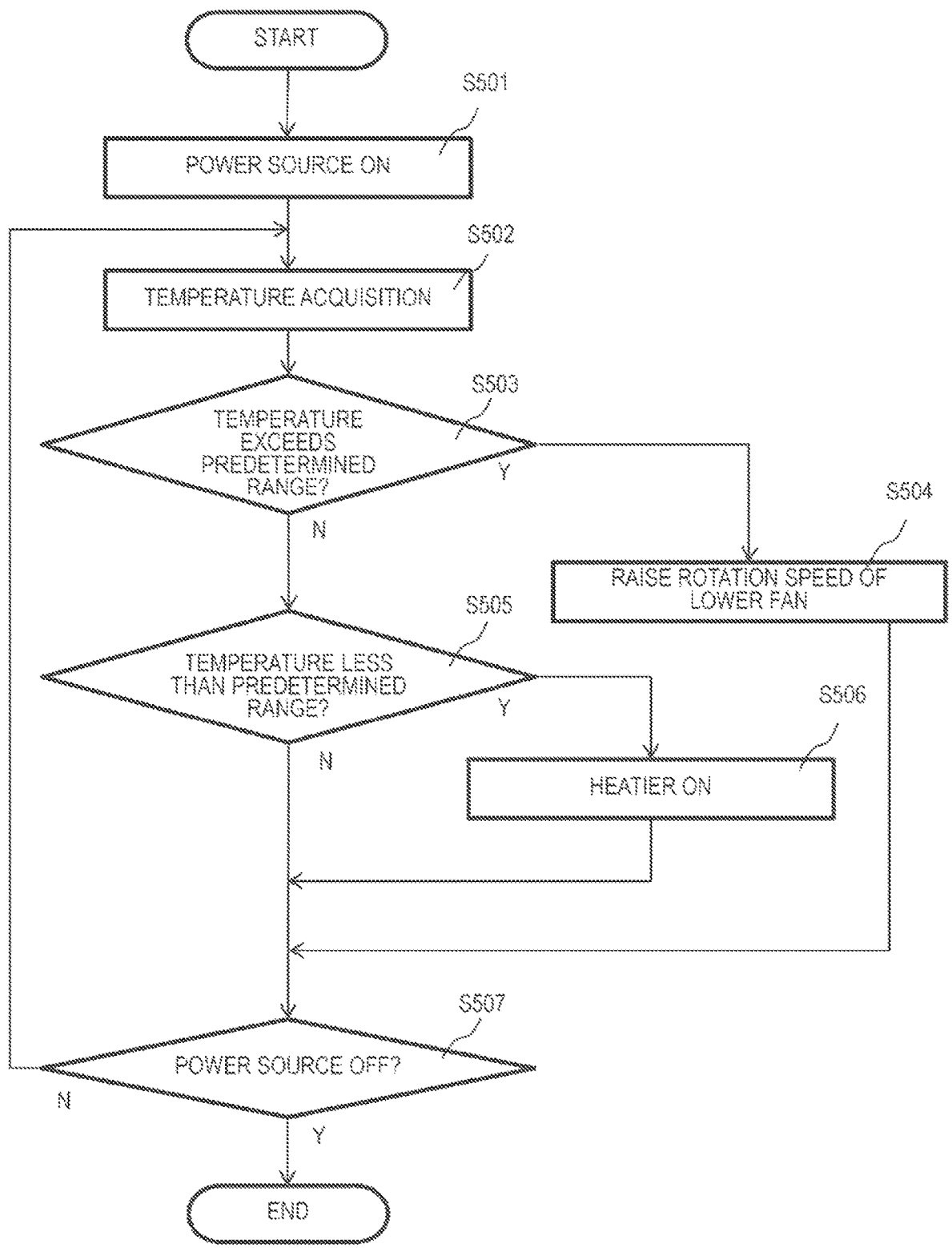
FIG. 7 is a flowchart of a fourth example of air conditioning control executed by the air conditioning device.

The air conditioning control according to a fourth example shown in FIG. 7 is effective particularly in cold climates. The controller 11 of the air conditioning device 10 performs actions such as turning on the heater 18*b* provided to the seat part 1*b* of the seat 1 and changing the rotation speed of the lower fan 13*b* in accordance with the temperature. The air conditioning control of the fourth example may be executed in addition to or independently of the air conditioning control of the first example and/or the second example. When air conditioning control of the fourth example is executed in addition to that of the first example and/or the second example, the air conditioning controls may be given priority rankings and executed accordingly.

The power source (not shown) of the air conditioning device 10 is turned on (S501) as in the first example. The heater 18*b* is in the off state, and the lower fan 13*b* rotates at a normal rotation speed.

The controller 11 acquires the temperature measured by the temperature sensor 15*b* (S502).

When the measured temperature exceeds a predetermined range (Yes in S503), the controller 11 raises the rotation speed of the lower fan 13*b* (S504). The flow of air within the air flow path A2 can thereby be promoted, and the user on the seat 1 can therefore be prevented from feeling heat. When the measured temperature is less than the predetermined range (Yes in S505), the controller 11 turns on the heater 18*b* (S506). The user on the seat 1 can feel warmth because the air in the air flow path A2 is warmed by the heater 18*b*.

As long as the power source is not turned off, steps S502 to S506 are repeated, and when the power source is turned off (Yes in S507), air conditioning control is ended.

As a modification of the fourth example, the controller 11 may raise the rotation speed of the lower fan 13*b* in addition to turning on the heater 18*b* in step S506. Air warmed by the heater 18*b* can thereby be delivered in a greater amount, and the user on the seat 1 can therefore feel warmth.

As another modification of the fourth example, the heater 18*b* may be turned on after the power source has been turned on (S501). In this case, the controller 11 may turn off the heater 18*b* in step S504, thereby ensuring that the user on the seat 1 does not feel heat. Alternatively, the rotation speed of the lower fan 13*b* may be lowered in addition to or instead of turning off the heater 18*b*, thereby ensuring that the user on the seat 1 does not feel heat. When the heater 18*b* is on, the rotation speed of the lower fan 13*b* may be raised in step S506 to deliver a greater amount of air warmed by the heater 18b, thereby ensuring that the user on the seat 1 feels warmth.

As yet another modification of the fourth example, the rotation speed of the lower fan 13b may be provided in multiple stages. In this case, the controller 11 may compare the measured temperature with a plurality of threshold values, determine the temperature, and change the rotation speed of the lower fan 13b to a stage that corresponds to the determination result.

1-3. Characteristics, Etc

According to one example of the air conditioning device 10 in Embodiment 1, the upper fan 13a and/or the lower fan 13b and the air flow paths A1, A2 are provided to at least one of the seat part 1b and the backrest part 1a of the seat 1, and the controller 11 determines the reclining state of the backrest part 1a relative to the seat part 1b and controls the air in the air flow paths A1, A2 in accordance with the determined reclining state. In addition to the seat 1 changing the reclining state from a fully reclined position to an upright position, the user sitting in the seat 1 may sit, lie, or otherwise occupy the seat while covered with a wrap or other covering. According to the air conditioning device 10, comfortable air environments can thus be created in individual seats 1 even in situations in which the state of the seat 1 and/or the posture of the passenger changes.

2. Other Embodiments

The embodiment was described above as an example of the technology disclosed in the present application. However, this is not a limitation on the technology in the present disclosure; the technology can also be applied to embodiments in which changes, replacements, additions, omissions, etc. are made as appropriate. It is also possible to combine the constituent elements described in the above embodiment to arrive at a new embodiment.

(1) The air conditioning device 10 according to Embodiment 1 shown in FIG. 3 comprises the upper fan 13a, the lower fan 13b, the pressure sensor 14a, the temperature sensors 15a, 15b, the humidity sensors 16a, 16b, the coolers 17a, 17b, and the heater 18b, but is not limited to comprising all these components and may comprise merely some of the components. For example, the air conditioning device 10 may comprise the upper fan 13a and/or the lower fan 13b alone.

(2) The humidity sensors 16a, 16b and/or the coolers 17a, 17b shown in FIGS. 1 to 3 may be disposed in either the backrest part 1a or the seat part 1b of the seat 1. In addition, a heater may be disposed in the backrest part 1a and a pressure sensor may be disposed in the seat part 1b.

(3) In the above embodiment, fans are given as examples of ventilation parts, but other means may be used. Alternatively, the air flow paths A1, A2 (FIGS. 1 and 2) formed in the seat 1 may alone constitute ventilation parts.

(4) In the above embodiment, some or all of the functions may be realized by a program. Some or all of the functions of the above embodiment may be executed by a processor in a computer. In addition, programs for performing these processes may be stored in a hard disk, ROM, or another storage device, and may be read and executed on ROM or RAM.

In the above embodiment, a processor configured from a dedicated electronic circuit designed to realize a predetermined function may be included instead of a MPU, a CPU, or another processor. The processor may be configured from one or a plurality of processors.

(5) The above description is not necessary provided by way of limitation on the steps of the air conditioning control shown in FIGS. 4 to 7; the steps can be executed in a different order or simultaneously without departing from the scope of the invention.

(6) In the present disclosure, the term "controller," "device," or "system" includes cases meaning a grouping of a plurality of constituent elements (devices, modules (components), etc.), and whether or not all the constituent elements are in the same housing is irrelevant. For example, the present disclosure includes cases in which the controller 11 of the air conditioning device 10 shown in FIG. 3 and the controller 51 of the management device 50 function as one controller of the air conditioning system 100.

A plurality of controllers stored in separate housings and connected via a network, and one controller with which a plurality of modules are stored inside one housing, may both be referred to as a device or a system. A plurality of devices stored in separate housings and connected via a network, and one device in which a plurality of modules are stored inside one housing, may both be referred to as a system.

KEY

1 Seat
1a Backrest part
1b Seat part
1c Reclining mechanism
1d Operation unit
2 Covering
10 Air conditioning device
11 Controller
13a Upper fan
13b Lower fan
14a Pressure sensor
15a Temperature sensor
15b Temperature sensor
16a Humidity sensor
16b Humidity sensor
17a Cooling unit
17b Cooling unit
18b Heating unit
19 Communication unit
20 Display device
21 Controller
22 Display unit
29 Communication unit
30 Imaging device
31 Image processing unit
32 Imaging unit
33 Lens
50 Management device
51 Controller
59 Communication unit
100 Air conditioning system
A1 Air flow path
A2 Air flow path
D1 Ventilation direction
D2 Ventilation direction

PRIOR ART LITERATURE

Patent Literature

[Patent Literature 1] Japanese Laid-open Patent Publication No. 2017-170983

The invention claimed is:

1. An air conditioning system comprising:
an air conditioning device for a reclining seat comprising a seat part and a backrest part, the air conditioning device comprising:
  a ventilator including a first air flow path which is provided to at least one of the seat part and the backrest part, and which is formed inside the seat part or inside the backrest part; and
  a controller that determines a reclining state of the backrest part with respect to the seat part, and controls air in the first air flow path in accordance with the determined reclining state; and
  an imaging device that captures an image of the seat and outputs an image of the seat,
the controller determining whether or not the seat is in a first state on the basis of the image of the seat,
the first state being a state in which a covering is over the seat, and
the controller causing the air in the first air flow path to be suctioned in and expelled such that air circulates between the first air flow path and a second air flow path formed in the covering when the seat is in the first state.

2. The air conditioning system as recited in claim 1, wherein
the reclining state includes a first position in which the backrest part forms substantially no angle with the seat part and a second position in which the backrest part has substantially a predetermined angle with the seat part, and
the controller causes the air in the first air flow path to be suctioned in and expelled such that air circulates between the first air flow path and the second air flow path when the seat is in the first position.

3. The air conditioning system as recited in claim 1, wherein
the air conditioning device comprises a temperature sensor and a humidity sensor, and
the controller controls the suctioning in and expelling of the air in the first air flow path such that a temperature measured by the temperature sensor and a humidity measured by the humidity sensor are within predetermined ranges when the seat is in the first state.

4. The air conditioning device as recited in claim 1, wherein
the air conditioning device comprises a pressure sensor that detects pressure exerted on the backrest part, and
the controller controls the air in the first air flow path in accordance with the pressure.

5. The air conditioning device as recited in claim 1, wherein
the air conditioning device comprises at least one of a temperature sensor that measures a temperature surrounding the seat and a humidity sensor that measures a humidity surrounding the seat, and
the controller controls the air in the first air flow path in accordance with at least one of the temperature and the humidity.

6. The air conditioning device as recited in claim 1, wherein
the air conditioning device comprises a cooler that cools the air in the first air flow path, and
the controller controls the air in the first air flow path by turning the cooler on and off.

7. The air conditioning device as recited in claim 1, wherein
the air conditioning device comprises a heater that warms the air in the first air flow path, and
the controller controls the air in the first air flow path by turning the heater on and off.

8. A seat comprising
the air conditioning device as recited in claim 1,
the seat part, and
the backrest part, which is capable of reclining at a predetermined angle in relation to the seat part.

* * * * *